United States Patent [19]
Singhal

[11] Patent Number: 5,191,275
[45] Date of Patent: Mar. 2, 1993

[54] RECHARGEABLE BATTERY PACK DEVICE

[76] Inventor: Tara C. Singhal, P.O. Box 5075, Torrance, Calif. 90510

[21] Appl. No.: 743,171

[22] Filed: Aug. 12, 1991

[51] Int. Cl.⁵ .......................................... H01M 10/44
[52] U.S. Cl. ........................................ 320/2; 320/15; 429/99
[58] Field of Search ............ 320/2, 15; 429/7, 96–100

[56] References Cited

U.S. PATENT DOCUMENTS

| | | | |
|---|---|---|---|
| 3,941,618 | 3/1976 | Mabuchi | 136/173 |
| 4,009,429 | 2/1977 | Mullersman | 320/2 |
| 4,229,686 | 10/1980 | Mullersman et al. | 320/2 |
| 4,315,364 | 2/1982 | Leffingwell | 320/2 |
| 4,383,007 | 5/1983 | Murphy | 429/96 |
| 4,468,439 | 8/1984 | Ohara et al. | 429/1 |
| 4,607,207 | 8/1986 | Bruneau | 320/2 |

OTHER PUBLICATIONS

Lafayette 1979 Catalog p. 108, 6V Battery Charger.

Primary Examiner—Steven L. Stephan
Assistant Examiner—Adolf Berhane

[57] ABSTRACT

A battery pack, made up of ordinary rechargeable nickel cadmium size AAA cells, that would output six volts and would fit inside the battery compartment of electrical devices designed to accommodate 4 AA size cells. This would obviate the need to carry and hook to the device external rechargeable battery packs. The battery pack also has electrical wires that end in a connector that could be used to charge the pack or power devices that need external battery packs. A charging bracket that enables charging of this power pack.

3 Claims, 1 Drawing Sheet

RECHARGEABLE BATTERY PACK DEVICE

BACKGROUND OF THE INVENTION

1. Field of the Invention

Some electronic devices are designed to run on 6 volt dc and have a battery compartment designed to accommodate four AA size battery cells for that purpose. The four AA size battery cells required are the alkaline type that generate 1.5 volt each, thus producing 6 volt in total when placed in a series configuration inside the battery compartment of the device.

These electronic devices cannot use size AA rechargeable (nickel cadmium) cells inside their battery compartment, since four rechargeable cells produce an output voltage of 4.8 volts only and not 6 volts. Because one nickel cadmium rechargeable cell produces 1.2 volts. Therefore these electronic devices are unable to use rechargeable battery cells inside their battery compartment. Those users desiring to use rechargeable battery cells to save money, are restricted to using external rechargeable battery packs that produce 6 volts.

The invention described herein is a six volt rechargeable battery pack device that would fit inside a battery compartment space designed for four size AA batteries, removing the necessity to have external cumbersome rechargeable battery packs. Similar battery packs or cassettes producing different voltages are useful in battery applications, that cannot use an arrangement of plurality of nickel cadmium rechargeable cells in place of an equal number of alkaline cells due to voltage difference in the two cell types and the resulting voltage difference in the arrangement of cells.

2. Description of Related Art

None to my knowledge.

SUMMARY OF THE INVENTION

This rechargeable battery pack is made up of rechargeable (nickel cadmium) size AAA cells. This pack consists of odd number of size AAA cells, and would output six volts. The pack is designed and sized to fit inside the battery compartment of electrical devices designed to operate on 6 volts. These devices accommodate 4 AA size non rechargeable cells in their battery compartment to output 6 volts. The rechargeable battery pack would obviate the need to carry and hook to the device external rechargeable battery packs.

DESCRIPTION OF THE PREFERRED EMBODIMENT

In battery applications, for which an arrangement of plurality of rechargeable nickel cadmium battery cells, in place of an equal number of same size alkaline battery cells is preferable but not used, due to voltage difference in the two cell types and the resulting voltage difference in the arrangement of cells, a battery cassette that can obviate this restriction is useful.

For example, a four cell arrangement of alkaline cells produces 6 volts, whereas a 4 cell arrangement of nickel cadmium cells produces 4.8 volts. A battery pack/cassette, made up of five size AAA nickel cadmium rechargeable cells, that would fit inside the space of four AA size alkaline cells arranged side by side longitudinally, and would produce 6 volts output, is described here. Other similar battery pack/cassettes arrangements are possible and are not ruled out in this specification.

Figure 1A:
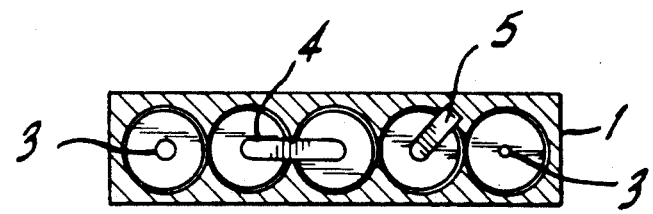
FIG. 1a-c. A bracket or housing arrangement designed to accommodate five size AAA cells in the space of four size AA cells.
Figure 1B:
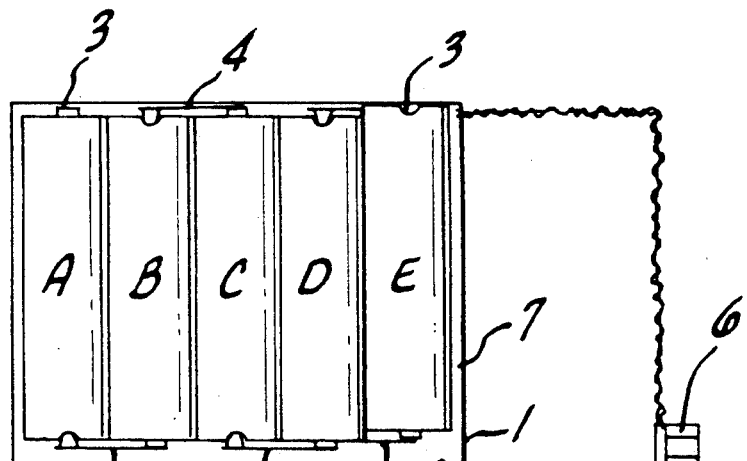
Figure 1C:
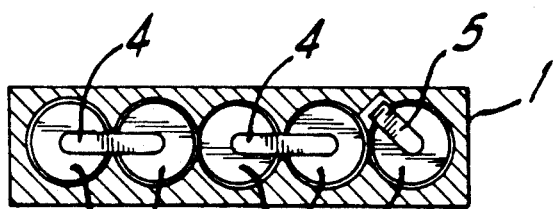

Refer to FIG. 1a-c. The rechargeable battery pack device consists of a suitable nonconductor, such as plastic, rigid bracket or housing whose external dimensions of overall length, width and height are the same as that of four AA size battery cells placed side by side(1). Inside of the bracket or housing consists of spaces and place holders for five AAA size battery cells(2). The spaces and place holders are referenced as A, B, C, D and E for ease of reference. The end spaces and place holders, that is A and E, are placed in relation to the bracket or housing in such a way that the AAA size cells that would be placed in these would be situated such that the positive and negative polarity ends of these cells would be in the same position spatially as would the positive and negative polarity ends of the edge cells of a set of four size AA cells that would be placed in the battery compartment(3). Thus, when the bracket or housing is inserted inside the battery compartment, the connections to battery compartment terminals would be automatically made by the battery cells in spaces A and E. The middle places B, C and D have size AAA cells inserted in them with alternating polarity.

There are metal strips with a bubble protrusion on one end and a conical spring on the other end. These metal strips are inserted or placed inside the bracket or housing in such a way that the cells when placed in adjacent place holders, their positive and negative polarity ends would make electrical contact(4). Such metal strips are placed between place holders A and B on the bottom end, between B and C on the top end, between C and D on the bottom end. To electrically connect the battery cells in spaces D and E, a double L shaped metal strip connector connects the two opposing ends of the cells placed in these place holders D and E (5).

The bracket or housing is symmetrical so that when it is flipped over, the end cells would still be in same relative position to the contacts of the battery compartment. This allows for the possibility that devices of different manufactures might have their cell battery arrangement in the battery compartment in reverse order.

To enable charging of this battery pack there are two alternative means as follows:

(a) There is a pair of electrical wires coming out of this pack that end in a male or female ended connector(6). When a charger of suitable voltage and current output is attached to this connector it would charge the battery pack. The electrical wires and the end connector is of such size and dimension that it would accommodate inside the space of the bracket or housing unless pulled from its place for use for charging(7).

If an electrical device requiring 6 volt is connected to this connector the pack would provide 6 volt output to power the device, thus making it suitable for use as a stand alone battery pack.

(b) The five nickel cadmium rechargeable size AAA cells can be removed from their places and charged in standard commercially available chargers.

Therefore I claim:

1. In battery applications, for which an arrangement of plurality of rechargeable nickel cadmium battery cells, in place of an equal number of same size alkaline battery cells is preferable but not used. due to voltage differences in the two cell types and the resulting voltage difference in the arrangement of cells. a battery cassette for use in such applications comprising of:

(a) a battery cassette housing whose external dimension are those of the space occupied by an arrangement of size AA alkaline cells;
(b) said cassette having inside it a plurality of size AAA Nickel cadmium type rechargeable cells;
(c) said plurality of size AAA cells in number being equal to output a voltage nearly equal to that output by said arrangement of size AA alkaline cells;
(d) said plurality of size AAA cells arranged in place holders. inside said battery cassette enabling them to remain secure in their places;
(e) said plurality of size AAA cells electrically connected in series. and resulting overall positive and negative terminals accessible from outside the said cassette:
(f) spatial position of said resulting overall positive and negative terminals being in the same spatial position as of the corresponding terminals of said arrangement of size AA alkaline cells.

2. The battery cassette of claim 1, further comprising of:

end user usable opening and closing means of said battery cassette enabling the discharged said plurality of size AAA cells to be removed and recharged size AAA cells to be inserted in said cassette.

3. The battery cassette of claim 1, further comprising of:

(a) said resulting overall positive and negative terminals, inside the cassette, connected to a twisted wire pair;
(b) other end of said twisted wire pair extending outside the cassette and terminated with a connector;
(c) said cassette having space to store said twisted wire and connector;
(d) said twisted wire and connector stored inside the cassette when not in use.

* * * * *